United States Patent
Scott et al.

(10) Patent No.: US 10,207,609 B2
(45) Date of Patent: Feb. 19, 2019

(54) VEHICLE SEAT BACK WITH FEATURE FOR GRASPING OF SEATBELT

(71) Applicant: FORD GLOBAL TECHNOLOGIES, LLC, Dearborn, MI (US)

(72) Inventors: Timothy Scott, Benfleet (GB);
Timothy Noble, Brentwood (GB);
Gregor Whelan, Great Dunmow (GB);
Daniel T Jackson, Noak Bridge Basildon Essex (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/943,892

(22) Filed: Nov. 17, 2015

(65) Prior Publication Data
US 2016/0137111 A1    May 19, 2016

(30) Foreign Application Priority Data

Nov. 17, 2014   (GB) .................................. 1420376.4

(51) Int. Cl.
*B60N 2/64*     (2006.01)
*B60R 22/02*    (2006.01)

(52) U.S. Cl.
CPC ............. *B60N 2/643* (2013.01); *B60R 22/02* (2013.01)

(58) Field of Classification Search
CPC ............................... B60N 2/643; B60R 22/02
USPC .......... 297/452.35, 452.34, 452.36, 483, 484
See application file for complete search history.

(56) References Cited

U.S. PATENT DOCUMENTS

| | | | | |
|---|---|---|---|---|
| 5,803,544 A * | 9/1998 | Block | ...................... | B60N 2/24 297/188.04 |
| 6,655,745 B2 * | 12/2003 | Fohrenkamm | ........... | B60N 2/24 297/188.04 |
| 7,367,630 B2 * | 5/2008 | Becker | .................. | B60R 22/023 297/464 |

(Continued)

FOREIGN PATENT DOCUMENTS

| | | |
|---|---|---|
| EP | 1880894 A2 | 1/2008 |
| EP | 2719576 A1 | 4/2014 |
| WO | 9014245 A1 | 11/1990 |

OTHER PUBLICATIONS

Intellectual Property Office, Search Report for the corresponding Great Britain Patent Application No. GB1420376.4 dated Feb. 25, 2015.

(Continued)

*Primary Examiner* — Milton Nelson, Jr.
(74) *Attorney, Agent, or Firm* — Frank A. MacKenzie; Bejin Bieneman PLC (57) ABSTRACT

A seat assembly for a vehicle includes a seat back having a cushion surface forming a bolster along a lateral edge thereof, a recess formed in the bolster, and a retractable seatbelt. When in a stowed condition, the seatbelt extends along the bolster between a top and a bottom thereof, and a portion of the seatbelt passes over the recess to create a space between an edge of the seatbelt and the cushion surface. The recess is sized and located to enable a seat occupant to insert fingers into the space and easily grasp the seatbelt for deploying it. The recess may be a depression in the cushion surface, or may be formed by a first portion of the bolster having a first radius smaller than a second radius of a second, un-recessed portion of the bolster adjoining the first portion.

11 Claims, 6 Drawing Sheets

(56) References Cited

U.S. PATENT DOCUMENTS

| | | | |
|---|---|---|---|
| 7,975,978 B2* | 7/2011 | Ziaylek | B60R 7/043 |
| | | | 248/154 |
| 2003/0038525 A1 | 2/2003 | Pond et al. | |
| 2009/0045657 A1* | 2/2009 | Bostrom | A62B 9/04 |
| | | | 297/188.04 |
| 2009/0322141 A1* | 12/2009 | Matsushita | B60R 22/03 |
| | | | 297/483 |
| 2011/0006508 A1 | 1/2011 | Nezaki | |
| 2012/0049600 A1 | 3/2012 | Parker et al. | |

OTHER PUBLICATIONS

Chinese Notification of First Office Action dated Dec. 5, 2018 re Appl. No. 201510742566.6.

* cited by examiner

VEHICLE SEAT BACK WITH FEATURE FOR GRASPING OF SEATBELT

CROSS-REFERENCE TO RELATED APPLICATIONS

This application claims foreign priority benefits under 35 U.S.C. § 119(a)-(d) to GB 1420376.4 filed Nov. 17, 2014, which is hereby incorporated by reference in its entirety.

TECHNICAL FIELD

The present disclosure relates to a seat assembly for a motor vehicle equipped with a retractable seat belt, and more specifically to such a seat assembly having a seat back with features for enabling easier grasping of the seatbelt when it is in a stowed or refracted condition.

BACKGROUND

Seatbelts, in particular rear seatbelts and seat-integrated front seatbelts, typically have the belt webbing lying flat against the seat cushion when in an unfastened and retracted (or stowed) condition. When the belt is being put on by a seat occupant (a user), the webbing has to be gripped by a user's fingers and pulled away from the seat cushion before it can be positioned over the user's body. This is normally an easy operation, however this may prove a more difficult task if the occupant is wearing thick gloves, or has impaired hand grip or mobility.

SUMMARY

According to an aspect of the present disclosure there is provided a seat back for a vehicle, the seat back comprising one or more features positioned between a top and a bottom of the seat back, the features being provided at one or more points on the seat back that are covered by a seatbelt in a stowed position, the one or more features being configured to expose an edge of a seatbelt to allow the seatbelt to be more easily gripped and deployed by a user.

One or more of the features may comprise a local depression in the seat back.

One or more of the features may comprise a raised projection protruding above the surrounding area of the seat back. For example, the projection may comprise a local peak in the surface of the seat back.

By contrast, the projection may comprise a ridge. The ridge may extend in a direction with a component perpendicular to a longitudinal axis of the seatbelt in the stowed position. Alternatively, the ridge may extend in a direction substantially parallel to a longitudinal axis of the seatbelt in the stowed position. A top surface of the ridge may be narrower than the width of the seatbelt such that the edge of the seatbelt may be exposed.

One or more of the features may comprise a radiused edge portion. The radiused edge portion may have a radius that is different from a radiused edge elsewhere along the same edge. For example, the radiused edge may comprise a tight radius edge that may be provided at or near the edge of the seat back. The tight radius edge may be curved with a radius that is tighter (e.g. smaller) than the radius elsewhere along the edge of the seat back.

One or more of the features may be configured to expose either or both edges of the seatbelt.

The seatbelt may extend along a front face of the seat back from the top of the seat back towards the bottom of the seat back in the stowed position.

A seat assembly may comprise the above-mentioned seat back and the seatbelt. The seatbelt may be configured to pass over the one or more features in the stowed position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1A-3D, a seat assembly 2 for a vehicle, such as a motor vehicle, comprises a seat back 10. The seat assembly 2 further comprises a seat bottom 20. The seat assembly 2 may also comprise a head rest 30, which may connect to a top 10a of the seat back.

The seat back 10 may be part of a vehicle front seat or of a vehicle rear seat. The seat back 10 and seat bottom 20 may be separate components that may for example be held together by virtue of a seat frame. Alternatively, the seat back 10 and seat bottom 20 may be integral. The seat back 10 and seat bottom 20 may or may not be pivotable with respect to one another.

Figure 1A:
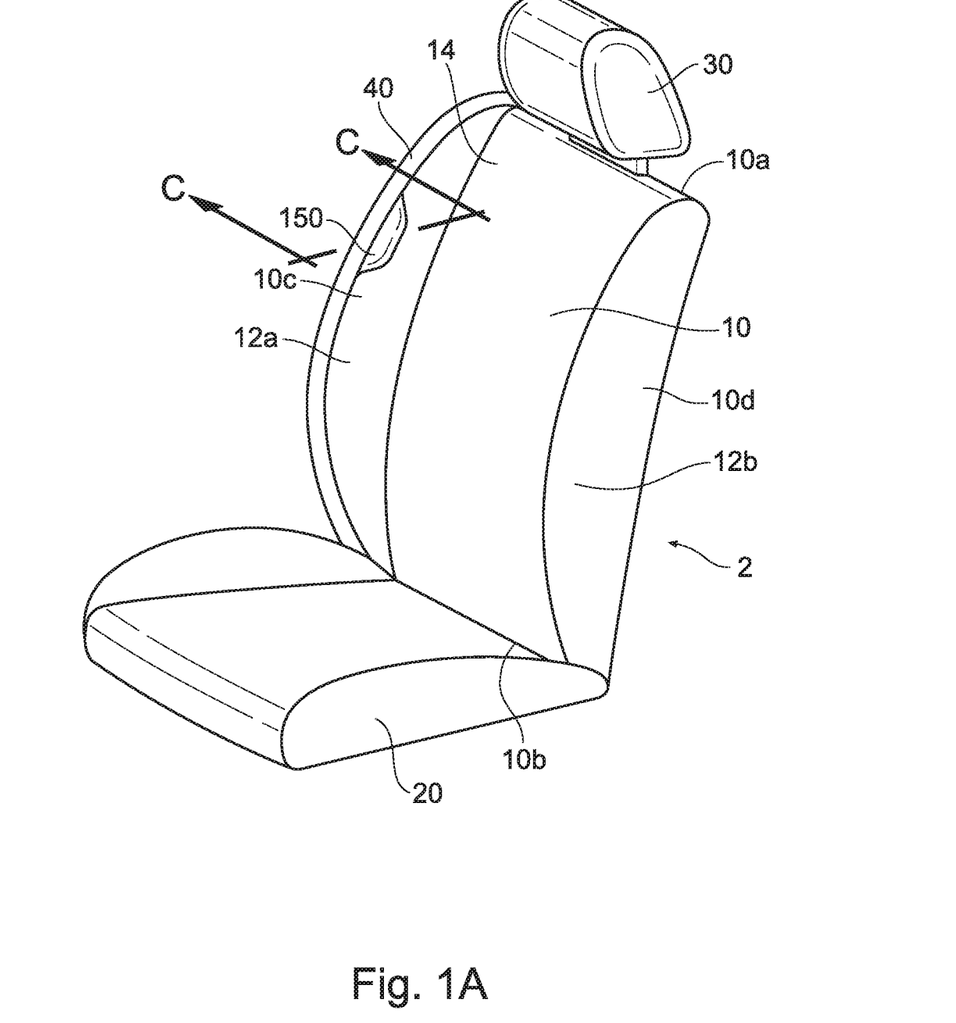
FIG. 1A shows a perspective view of a seat back according to a first example of the present disclosure applied to a seat having bolsters.
Figure 2A:
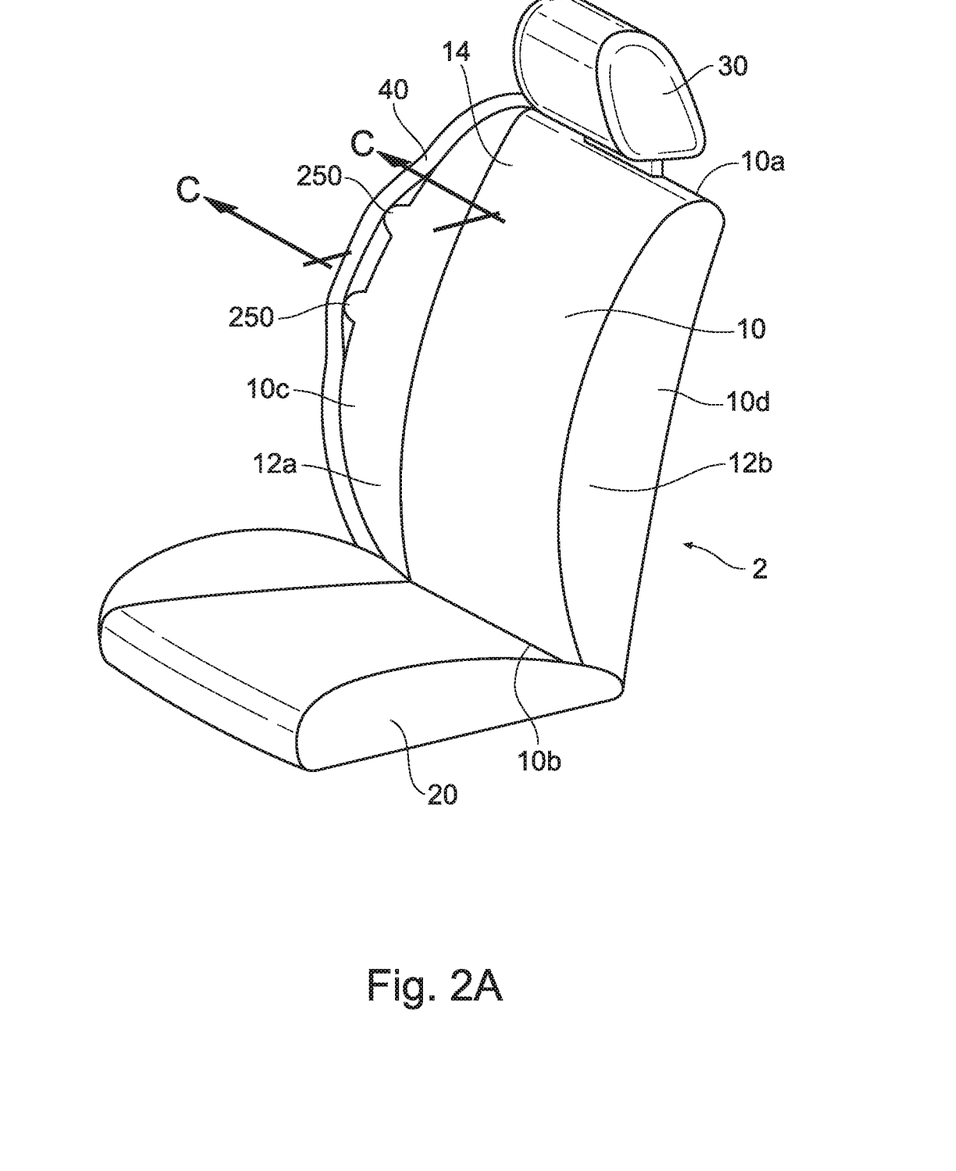
FIG. 2A shows a perspective view of a seat back according to a second example of the present disclosure applied to a front seat.
Figure 3A:
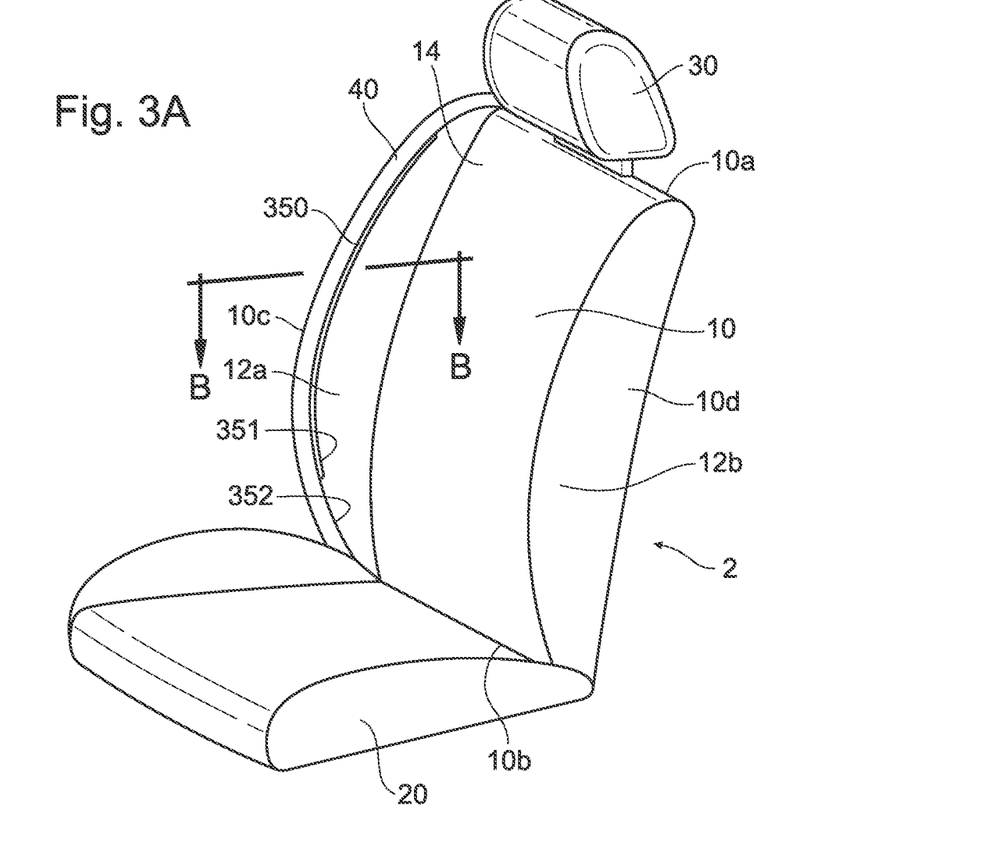
FIG. 3A shows a perspective view of a seat back according to a third example of the present disclosure applied to a seat having bolsters.

As depicted in FIGS. 1A, 2A and 3A, the seat back 10 may comprise bolsters 12a, 12b, which are provided along respective right and left lateral edges 10c, 10d of the seat back. An outer surface of the bolsters 12a, 12b may be curved, for example in the transverse or horizontal plane shown in FIGS. 3B and 3D. The bolsters 12a, 12b may otherwise follow the contours of the remaining seat back 10.

Figure 1B:
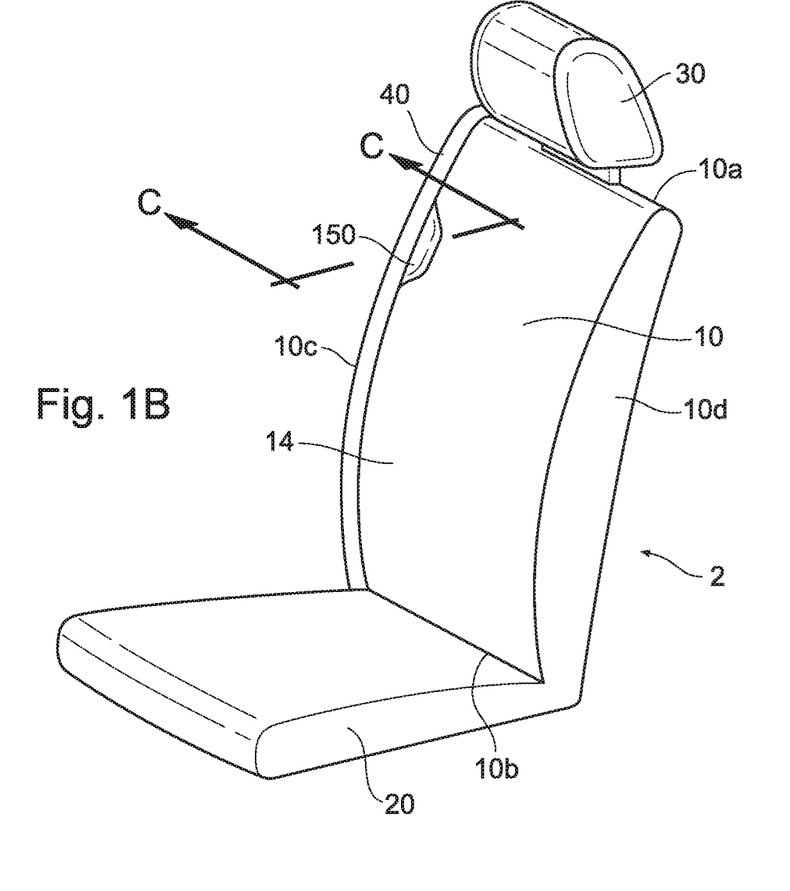
FIG. 1B shows a perspective view of a seat back according to a first example of the present disclosure applied to a rear seat.
Figure 2B:
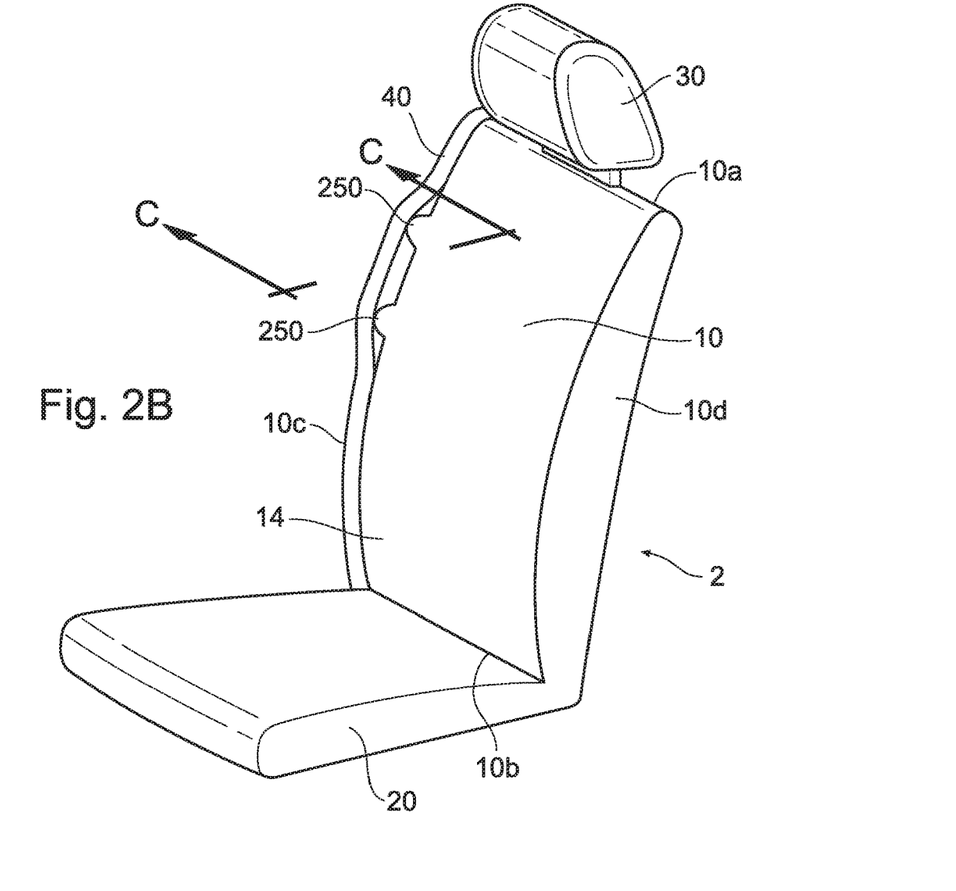
FIG. 2B shows a perspective view of a seat back according to a second example of the present disclosure applied to a rear seat.
Figure 3B:
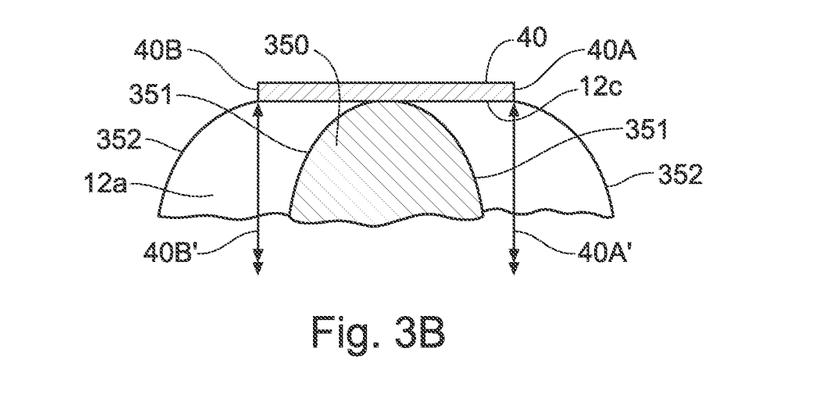
FIG. 3B shows a cross-sectional view taken along line B-B of FIG. 3A.
Figure 3C:
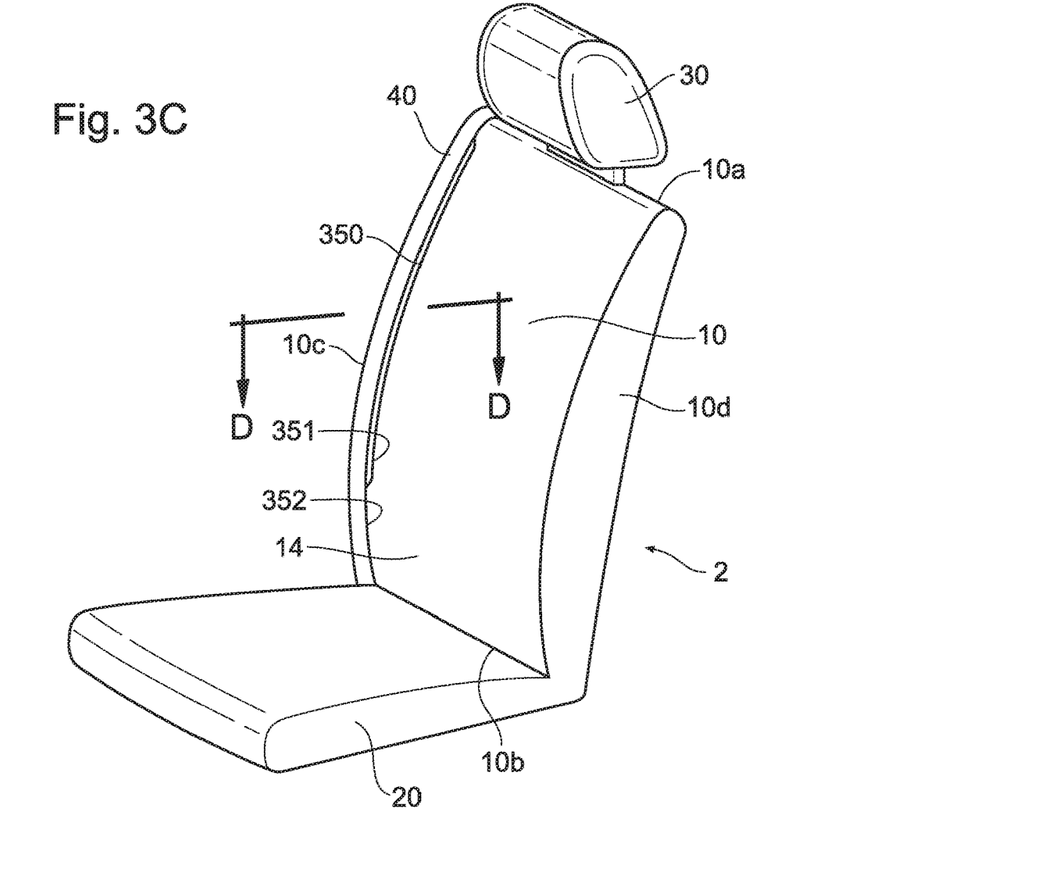
FIG. 3C shows a perspective view of a seat back according to a third example of the present disclosure applied to a seat without bolsters.

However, as depicted in FIGS. 1B, 2B, 3C, the seat back 10 may not comprise bolsters. A single seat, such as a vehicle front seat may comprise the bolsters 12a, 12b. By contrast, a seat, which forms part of a bank or bench of seats, such as a vehicle rear seat, may not comprise the bolsters.

It will be appreciated that the seat back 10 (including, when applicable, the bolsters 12a, 12b) may comprise one or more cushions (of a type well known in the art) formed of foam or other resilient material covered in a membrane, such as a fabric, leather or other suitable material. The seat bottom 20 may be similarly cushioned.

The seat assembly 2 may further comprise one or more seatbelts 40. In a stowed position (e.g. before a vehicle occupant deploys the seatbelt), the seatbelt 40 may extend along a front face 14 of the seat back from the top 10a of the seat back towards a bottom 10b of the seat back.

The seatbelt 40 when stowed or retracted may be disposed so as to rest on the seat back 10 with the seatbelt being flat, e.g. substantially flat, against the surface of the cushion of the seat back front face 14. As depicted the seatbelt 40 may extend along or parallel to lateral edges 10c, 10d of the seat back in the stowed position. The seatbelt 40 may be provided along or parallel to the lateral edge 10c, 10d on either side of the seat back 10, for example an inboard or an outboard (relative to the vehicle overall) lateral edge of the seat back.

If bolsters 12a, 12b are provided, the seatbelt 40 may rest on the cushion surface which forms the bolsters. Although the bolsters 12a, 12b may be curved, the flexible nature of the seatbelt webbing may result in the seatbelt lying flat against the cushion surface of the bolsters in the stowed position. The bolsters 12a, 12b may also comprise a substantially flat top surface or "crown" 12c to encourage the seatbelt to lie flat (e.g. as depicted in FIG. 3B). A flat stowed position for the seatbelt may be desired for aesthetic purposes.

The seat belt 40 may be a 3-point seatbelt, which may be diagonally disposed across the body of a vehicle occupant when deployed. Alternatively or additionally, the seat assembly 2 may comprise a 2-point seatbelt 40, which may not cross the torso of a vehicle occupant when deployed. Such a 2-point seatbelt may go over the shoulder of a vehicle occupant when deployed.

In a particular example, the seat assembly 2 may comprise both of the above-described 3-point and 2-point seatbelts 40. Such an arrangement may advantageously restrict forward and twisting movement of the vehicle occupant in the event of an accident.

The seat assembly 2 may further comprise a seatbelt guide (not shown). The seatbelt guide may guide the seatbelt 40 over the seat back 10. The seatbelt guide may be provided at or towards the seat back top 10a, e.g. to one side of the head rest 30. The seatbelt guide may comprise a seatbelt retractor (not shown). The seatbelt retractor may pull the seatbelt 40 taut when in the stowed position such that the seatbelt lays flat against the cushion surface of the seat back. The seatbelt 40 may be anchored at or near the seat back bottom 10b. Alternatively, the seatbelt 40 may be anchored at or near the seat back top 10a and the seatbelt retractor may be provided at or near the seat back bottom 10b.

According to examples of the present disclosure, the seat back 10 comprises one or more features 50 positioned between the seat back top and bottom 10a, 10b. The features 50 are provided at one or more locations on the seat back 10 that are at least partially covered by the seatbelt 40 in the stowed position. The one or more features 50 are configured to expose one or both of the edges 40A and 40B of the seatbelt 40 and to thereby allow the seatbelt to be more easily gripped and deployed by a user. Deploying seatbelts that lie flat on the seat back cushion surface can be difficult and, by exposing an edge 40A of the seatbelt such that the edge 40A is spaced apart from the seat back cushion at that location by a first space indicated by an arrow 40A' and an edge 40B of the seatbelt such that the edge 40B may be spaced apart from the seat back cushion by a second space indicated by an arrow 40B', as illustrated by the example arrangements of FIGS. 3b and 3d, enables the user to pass or insert their fingers between the belt 40 and the seat back 10 and thus more readily grasp and deploy the seatbelt.

Figure 1C:
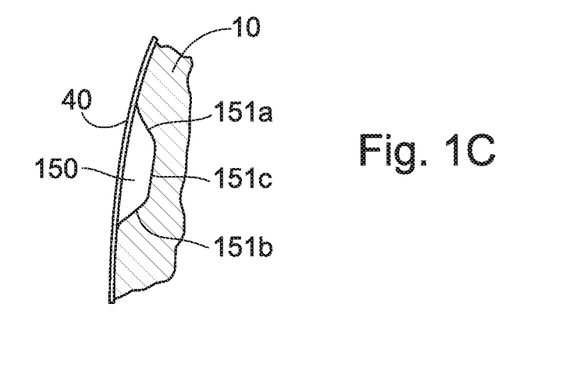
FIG. 1C shows a cross-sectional side view taken along line C-C of either of FIG. 1A or FIG. 1B

In a first example of the present disclosure shown in FIGS. 1A, 1B and 1C, one or more of the features comprises a local recess or depression 150 in the seat back. In the case of the particular example shown in FIG. 1A, the recess or depression 150 may be provided in the cushion forming one or more of the bolsters 12a, 12b below a top of the seat back and a top of the bolster 12. As depicted, the depression may extend across the width of the bolster so that the seatbelt 40 can be readily grasped from either side. However, it is also envisaged that the depression 150 may extend only partially across the width of the bolster so that the depression is accessible from only one edge of the seatbelt, for example from the side away from a center of the seat back. Such an arrangement may be advantageous since it may better maintain the function of the bolster while permitting ready access to the seatbelt.

Alternatively, as shown in FIG. 1B, where the seat back has no bolsters, the depression 150 may be provided at an edge 10c, 10d of the seat back 10. The depression may extend beyond the width of the seatbelt 40 so that the seatbelt 40 can be readily grasped from either side. However, it is also envisaged that the depression 150 may extend only partially across the width of the seatbelt so that the depression is accessible from only one edge of the seatbelt, for example from the side away from the occupant of the seat.

As best depicted in the side sectional view of FIG. 1C, sidewalls 151a, 151b of the depression 150 may be sloped, e.g. relative to a bottom 151c of the depression. Alternatively, the sidewalls 151a, 151b may be substantially perpendicular to a bottom 151c of the depression. Further still, the depression 150 may be curved, for example with the sidewalls and bottom of the depression being formed from a single curve. Such arrangements may assist neatly covering the cushion of the seat back 10 without puckering of the membrane which covers the resilient interior material of the cushion.

The depression 150 may be sized to accommodate a typical hand. For example, the height of the depression 150, e.g. the distance between sidewalls 151a, 151b, may correspond approximately to the width of a typical hand. Alternatively, the height of the depression 150 may be greater than the width of a hand so that the seatbelt 40 may be grasped at any spot along a range of locations. The depth of the depression, e.g. the distance between the bottom 151c and the seatbelt 40, may correspond approximately to the thickness of a typical hand or finger. In this way a user's hand or fingers may readily fit into the depression 150.

Furthermore, the depression 150 may be provided at a vertical location on the seat back that is lower than a shoulder of a typical seated vehicle occupant. Avoiding the shoulder area of the seat back may help to maintain the support function of the bolsters 12a, 12b and reduce the likelihood of the occupant feeling the presence of the depression 150. In addition, the depression 150 may be provided at a location that is convenient for a typical vehicle occupant to reach when seated and deploying the seatbelt. For example, the depression 150 may be provided at approximately a mid-height (half way between the top and bottom) of the seat back 10. Such a position may be an optimal compromise between avoiding the shoulder region and enabling the occupant to grasp the seatbelt at a location that facilitates extraction of the seatbelt from the refractor.

Figure 2C:
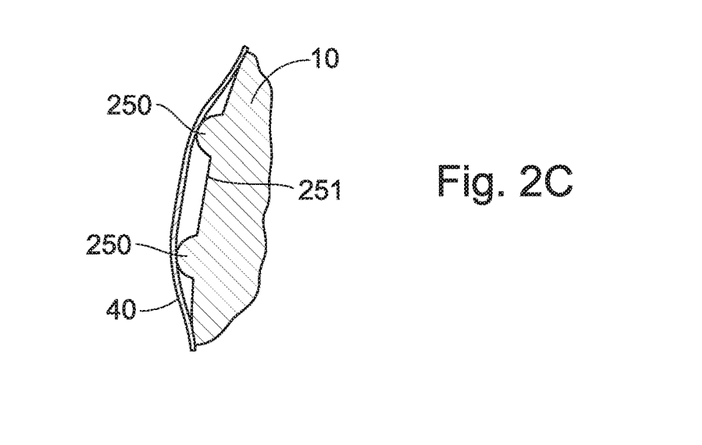
FIG. 2C shows a cross-sectional side view taken along line C-C of either of FIG. 2A or FIG. 2B

In a second example of the present disclosure shown in FIGS. 2A, 2B and 2C, one or more of the features may comprise a raised projection 250. The raised projection 250 may protrude above the surrounding area(s) of the seat back 10. For example, the projection 250 may comprise a local peak in the surface of the seat back. The projections 250 may or may not protrude from the bolsters 12*a*, 12*b* as shown in FIGS. 2A and 2B respectively.

In the particular example shown two peaks are provided, but it will be appreciated that any number of such projections 250 may be provided. In the case of there being more than one projection, the projections may be spaced apart in a longitudinal direction of the seatbelt 40. The projections 250 may be spaced apart to accommodate a typical hand, e.g. the distance between neighboring projections 250 may correspond approximately to the width of a typical hand.

The height of the projection 250, e.g. the distance between a base 251 of the projection and the seatbelt 40, may correspond approximately to the thickness of a typical hand or finger. In this way a user's hand or fingers may readily fit between the seatbelt 40 and the seat back 10.

In an example, the projection 250 may comprise a logo. The logo itself may form the projection or the logo may be provided on top of the projection. The logo may be embossed or woven into the seat back 10.

In an alternative example, the projection may comprise a ridge. The ridge may extend in a direction with a component perpendicular to a longitudinal axis of the seatbelt 40 in the stowed position. Alternatively, the ridge may extend in a direction substantially parallel to a longitudinal axis of the seatbelt 40 in the stowed position. A top surface of the ridge may be narrower than the width of the seatbelt such that the edge of the seatbelt may be exposed. By way of example, the ridge may comprise piping, which may be provided at a seam.

Figure 3D:
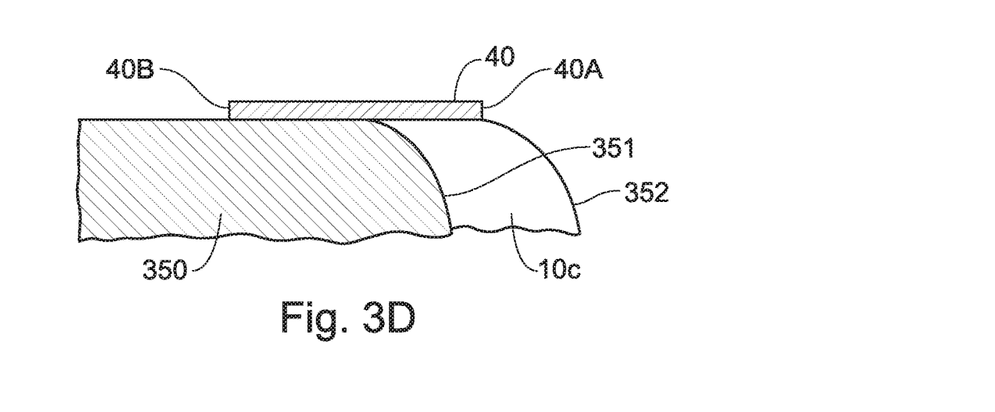
FIG. 3D shows a cross-sectional view taken along line D-D of FIG. 3C.

In a third example of the present disclosure shown in FIGS. 3A-3D, one or more of the features may comprise a radiused edge 350 provided at or near the edge of the cushion of the seat back. As depicted in FIGS. 3B and 3D, the radiused edge 350 may be curved (e.g. in the transverse plane of the seat back as depicted in FIGS. 3B and 3D) with a first radius 351 that is tighter (e.g. smaller) than a second radius 352 elsewhere along the edge of the seat back.

The radiused edge 350 may be provided on a seat back 10 that may or may not comprise the bolsters 12*a*, 12*b* as shown in FIGS. 3A-B and 3C-D respectively. In the case of the radiused edge 350 being provided on a bolster, either side or both sides of the bolster may comprise a radiused edge. In the example depicted in FIG. 3B both sides of the bolster are provided with a radiused edge 350.

In the case of the radiused edge 350 being provided on a seat back without a bolster, the radiused edge 350 may be set back (e.g. in a lateral direction) from the remainder of the edge 10*c* or 10*d*. The radiused edge may join the remainder of the seat back front 14 at a point beneath the seatbelt (as depicted in FIG. 3D) or at a point laterally set back from the seatbelt (as depicted in FIG. 3C). In the latter case, the seatbelt 40 may then be readily grasped from either side. As mentioned above, the first radius 351 may be tighter (e.g. smaller) than the second radius 352 elsewhere along the edge of the seat back. However, in an alternative arrangement, the first radius 351 may be greater than the second radius 352.

The radiused edge 350 may extend along a portion of the length of the seat back edge 10*c*, 10*d*. For example, as depicted in FIGS. 3A and 3C the radiused edge 350 may extend over a substantial portion of the length of the seat back edge 10*c*, 10*d*, e.g. from close to the seat back top 10*a* to close to the seat back bottom 10*b*. In this way, the seatbelt 40 may be readily grasped at a range of locations. Alternatively, the radiused edge 350 may be provided over a smaller length of the seat back edge 10*c*, 10*d*, e.g. with a length corresponding approximately to the width of a typical hand.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A seat assembly for a vehicle, comprising:
   a seat back having a cushion surface forming a bolster along an outboard lateral edge thereof, a recess formed in the bolster below a top of the bolster, the recess having a bottom bordered by sidewalls, the sidewalls of the recess being located between a top and a midpoint of the seat back; and
   a retractable seatbelt when stowed extending along the bolster between the top and a bottom thereof, a portion of the seatbelt passing over the recess to create a first space between a first edge of the seatbelt and the cushion surface.

2. The seat assembly of claim 1, wherein the recess extends across the bolster, creating a second space between a second edge of the seatbelt and the cushion surface.

3. The seat assembly of claim 1, wherein the recess and the first edge of the seatbelt are disposed on an outboard side of the bolster.

4. The seat assembly of claim 3, the bolster further comprising a radiused edge having a smaller radius on an inboard side and an outboard side at the recess than a second radius elsewhere along the bolster.

5. The seat assembly of claim 3, the bolster further comprising a radiused edge having a smaller radius on at least one of an inboard side and an outboard side at the recess than a second radius elsewhere along the bolster.

6. An apparatus for a vehicle, comprising:
   a seat back having a recess formed in a cushion surface thereof below a top of the seat back and adjacent an outboard lateral edge thereof and the recess including a bottom and sidewalls, the sidewalls being located between the top and a midpoint of the seat back; and
   a retractable seatbelt when stowed extending along the cushion surface with a portion passing over the recess to create a first space between an edge of the seatbelt and the cushion surface.

7. The apparatus of claim 6, wherein the recess extends beyond an inboard second edge of the seatbelt, creating a second space between a second edge of the seatbelt and the cushion surface.

8. The apparatus of claim 6, wherein the recess and the first edge of the seatbelt are disposed on an outboard side away from a center of the seat back.

9. The apparatus of claim 8, wherein the seat back comprises a bolster at the outboard lateral edge and the recess is formed in the bolster.

10. A seat assembly for a vehicle, comprising:
- a seat back having a cushion surface forming a bolster along an outboard lateral edge thereof, a recess formed in the bolster below a top of the bolster, the bolster including a radiused edge having a smaller radius on at least one of an inboard side and an outboard side at the recess than a second radius elsewhere along the bolster, the recess having a bottom bordered by sidewalls, the recess being located approximately half way between a top and a bottom of the seat back; and
- a retractable seatbelt when stowed extending along the bolster between the top and a bottom thereof, a portion of the seatbelt passing over the recess to create a first space between a first edge of the seatbelt and the cushion surface, wherein the recess and the first edge of the seatbelt are disposed on an outboard side of the bolster.

11. The seat assembly of claim 10, wherein the smaller radius is on each of the inboard side and the outboard side.

* * * * *